Feb. 19, 1952     H. STUWE     2,586,185
FLYWHEEL ROTATING DEVICE
Filed Feb. 7, 1950
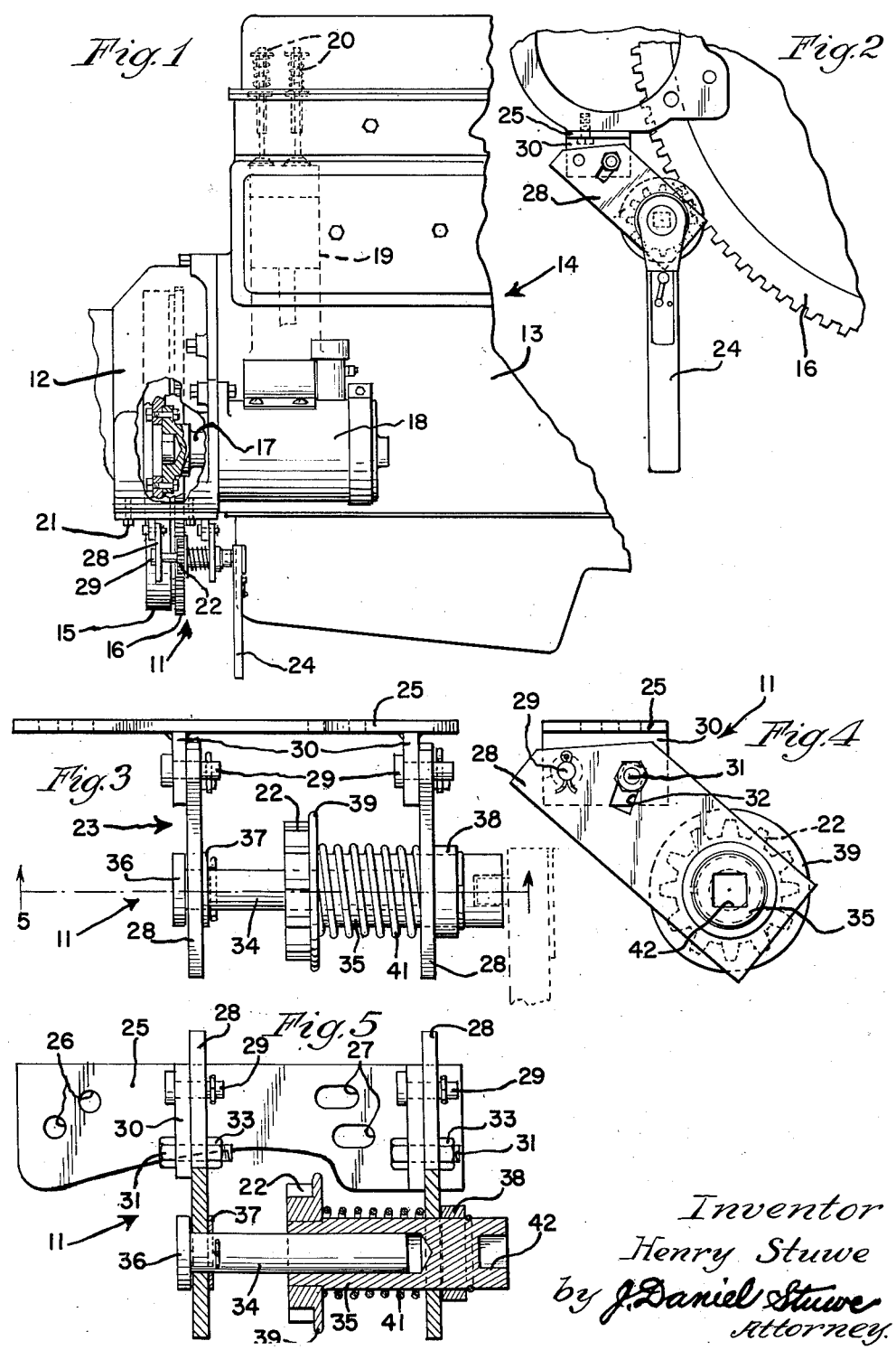
Inventor
Henry Stuwe
by J. Daniel Stuwe
Attorney Patented Feb. 19, 1952

2,586,185

UNITED STATES PATENT OFFICE 2,586,185

FLYWHEEL ROTATING DEVICE

Henry Stuwe, Westbrook, Minn.

Application February 7, 1950, Serial No. 142,782

5 Claims. (Cl. 81—54)

1

This invention relates to a novel flywheel rotating device.

The devices and tools of this class which are now obtainable on the market or in use, as far as known to me, that are intended for rotating the flywheel and its gear and the connected crankshaft of an automobile, during the process of inspecting or doing work on the bearings and clutch and valves, etc., of said automobile, are all arranged rather inefficiently and so that the flywheel and crankshaft can be rotated or turned therewith only thru a quarter of a revolution at a time, with each grip or attachment thereon of such former device or tool. Consequently such a device has to be re-set and a new hold has to be taken thereby onto the gear or connected rotary part at each quarter turn of said gear and shaft for rotating the same, during such inspection and work on the bearings and clutch and other associated parts.

It is an essential object and purpose of my present invention to provide an improved device which is readily attachable to the automobile and is conveniently operable for rotating the flywheel with its gear and the connected crankshaft thereof, to an exact extent and for a full rotation of said gear without re-setting this device, and therewith provide an efficient and handily usable device for the inspection and repair work on the bearings and clutch and the like of such automobile.

Another object of this invention is to provide a novel device of this kind which can be readily mounted onto the automobile so as to be supported thereon, adjacent the flywheel and its gear, and thus to be conveniently operable by the mechanic himself, for rotating said gear a complete revolution during such inspection and repair work; and which device can also be again readily detached from said automobile.

Another and more particular object of this invention is to provide such an improved device which can be conveniently mounted in position onto the main or upper part of the flywheel housing of an automobile, when the lower part of said housing has been detached, as is generally required anyway, for the contemplated inspection and work on the aforesaid parts, and whereby the flywheel and crankshaft can then be rotated as desired.

These and various other objects and advantages are attained with this invention, as will become apparent from the following description, taken in connection with the accompanying drawing wherein it is illustrated in a preferred

2 form, it being evident that other arrangements and forms of construction may be resorted to in carrying out the objects and purposes of this invention.

In the drawing:

Fig. 1 is a side elevational view, showing part of an automobile, including the flywheel with its gear and the connected end of the crankshaft and the housing mounted thereover and over the clutch, with my invention mounted on said housing and in mesh with said gear.

Fig. 2 is a fragmentary elevational end view of said gear and housing, with this invention mounted in its operative position thereon and having a wrench applied thereto.

Fig. 3 is a side elevational view of this invention.

Fig. 4 is an end elevational view thereof.

Fig. 5 is an inverted sectional view, looking upward on line 5—5 of Fig. 3.

In the drawing my novel flywheel rotating device is shown in a preferred form, and in Fig. 1 it is shown mounted on the flywheel housing 12 which is bolted to the rearward part of a casing 13 of an automobile 14. Said housing 12 covers the flywheel 15 with its attached ring or gear 16 and the thereto connected end of the crankshaft 17, and in this type of automobile the housing 12 also covers the clutch mechanism that is connected with the rear part of said flywheel 15, in the usual manner. Herein the starting motor 18 and the pistons 19 and the valves 20 are operatively connected with said flywheel and crankshaft, in the customary and well known manner.

As is well known by the automobile mechanic and those skilled in this art, the flywheel housing 12 has a lower housing part or pan (not shown) which is detachably mounted underneath this illustrated main upper part, for incasing the lower portions of said flywheel and gear and clutch, and such lower part is customarily secured underneath said upper part of this housing 12 by several securing bolts 21 which are releasable to allow for the customary removal of such lower part, so as to provide access to the clutch and bearings, etc., for the usual inspection thereof and work thereon.

This novel device 11 comprises a pinion 22 and means 23 for mounting it on the automobile to be in mesh with said gear 16, so as to be supported in position and readily actuated by a mechanic's tool, such as a wrench 24, which can be continuously operated for rotating said gear a full revolution if desired, without re-setting either said device or said wrench during such repair work as stated above.

In this illustrated form of my invention this mounting means 23 comprises a bracket member 25 which is provided with two sets of holes 26 and 27 that are arranged so as to receive and fit onto said securing bolts 21 provided on housing 12, when the lower part of the housing has been detached preparatory to said inspection and work; and as shown in Fig. 5, one set of these bolt holes, 27 herein, may furthermore be elongated or enlarged so as to provide for some variation in the shape and location of such bolts, and thus facilitate the mounting of this device in proper position on said bolts on this housing 12, as best shown in Fig. 1 of the drawing. Said mounting means further includes arms or elements 28 which are mounted by pivot pins 29 onto lugs 30 depending underneath said member 25, and a bolt 31 in each of said lugs 30 extends thru a slot 32 provided in each arm 28, to allow for adjustment of said arms on said member, while a nut 33 on the bolt 31 secures the arm in its adjusted position.

Means is provided for carrying and supporting the pinion 22 rotatably in the arms 28, and it is preferably arranged in two parts 34 and 35 which are movable longitudinally of one another to provide for adjustment; and these shaft parts are mounted in suitable openings provided in arms 28 to allow rotation therein, as best shown in Fig. 5. The shaft part 34 is provided with end means, as a head 36, also a washer 37 and spline, to retain said part in place in the arm; while in this disclosed form of device the shaft part 35 is in the shape of a sleeve slidably embracing said part 34, and it has the pinion 22 secured on its inward end and has a washer 38 on its outward end, held thereon by a suitable securing element and bearing against one of the arms 28.

This pinion 22 herein is provided with a flange 39 extending radially from one side thereof, adapted to engage against one side of the teeth on the gear 16; and a spring 41 is mounted on the shaft part 35, between the pinion 22 and an arm 28, in order to urge and hold the pinion flange 39 against said gear teeth and thus retain the pinion in proper position in engagement with said gear.

One of these shaft parts, part 35 herein, has its outward end arranged and constructed to be engaged by a suitable mechanic's tool, shown as a wrench 24 herein, for rotating the pinion, which may be done by providing an angular part at said end, being shown herein in the shape of an angular opening or socket 42 in the outer end of the shaft part 35, adapted for engagement by a ratchet wrench or socket wrench, that is customarily utilized by the automobile mechanic in doing such inspection and repair work of this kind.

It is apparent from the above disclosure that this novel device can be readily mounted in place on the housing 12, by use of the customary securing bolts 21, when the lower part or bottom pan of such housing has been removed for the contemplated inspection and repair work of said housed parts, so as to place the pinion 22 in mesh with the gear 16; and that the wrench 24 can be readily attached to the shaft part 35, and can then be conveniently actuated for rotating the gear and flywheel and crankshaft to the exact extent desired and for a complete revolution of said wheel and shaft if required, and also that this device along with said wrench will thus be supported and retained in the operative position on said gear, while the mechanic proceeds with said work. This device can also be readily removed thereafter, by merely manipulating the bolts 21 preparatory to replacing the lower part or pan on the housing.

I claim:

1. A device mountable on an automobile flywheel housing which covers the flywheel and its attached gear and has its lower part open to expose part of said gear, said device comprising one bracket member readily attachable to and detachable from one side of said open lower part, arms adjustably mounted on said member, a pinion, and cooperating shaft parts rotatably mounted in said arms and carrying said pinion in mesh with said gear, adjacent said side of said open lower part and higher than the lowest part of said gear, one of the shaft parts being secured to the pinion and having its end arranged to have a wrench attached thereto for rotating the pinion and thereby the flywheel a complete revolution.

2. The subject matter set forth in claim 1, and wherein the pinion contains side means to bear against the side of the teeth on said gear, while the shaft parts are adjustable one on the other lengthwise, and means is provided for resiliently holding the pinion with its side means bearing against the side of the gear-teeth.

3. A device for rotating an automobile flywheel and its attached gear which have a housing thereover containing depending bolts for supporting a detachable lower housing part, said device comprising mounting means including a member equipped for receiving said bolts whereby to mount the device readily and detachably onto the housing, arms adjustably mounted on said member, a shaft carried in said arms and including parts interconnected for adjustment lengthwise, a pinion connected to one of said parts to be in mesh with said gear, means extending radially of the pinion to engage the side of the gear-teeth, means resiliently holding the last said means against the gear-teeth, and an angular part on the end of said pinion-connected shaft part for engagement by a ratchet wrench operable for rotating the pinion and gear and flywheel.

4. A device for rotating an automobile flywheel and attached gear containing a housing thereover, said device comprising mounting means including means detachably attachable to said housing, a pinion, means including telescopically adjustable shaft parts carrying said pinion rotatably on said detachable means, side means on the pinion to engage the side of the gear, resilient means to automatically adjust said shaft parts and urge said side means against the gear, and means on said pinion carrying means to be engaged by a wrench operable for rotating the pinion and thereby the gear and flywheel a complete revolution, by one such attachment of this device.

5. A device mountable on the housing of an automobile flywheel and attached gear which housing contains depending bolts supporting a bottom pan that is detachable to provide a lower opening and expose part of said gear, said device being relatively small and compact and consisting of a bracket plate equipped for receiving the bolts whereby to mount this plate and thereby this device at one side of said opening, a pair of arms and means mounting them adjustably onto said plate to depend therefrom, a shaft carried by said arms and including parts interconnected for adjustment lengthwise, a pinion secured on one of said parts and in mesh with said gear, close to said one side of said opening, means on the end of one of said shaft parts to be engaged by a wrench for rotating said pinion and gear, and means on said pinion and on said shaft which cooperate to automatically adjust said shaft parts lengthwise and to retain the pinion in properly aligned engagement with the gear.

HENRY STUWE.

REFERENCES CITED

The following references are of record in the file of this patent:

UNITED STATES PATENTS

| Number | Name | Date |
|---|---|---|
| 1,823,426 | Ferris | Sept. 15, 1931 |
| 2,288,228 | De Biasse | June 30, 1942 |
| 2,295,720 | Dietzmann et al. | Sept. 15, 1942 |
| 2,479,144 | Voycheske | Aug. 16, 1949 |
| 2,527,288 | Able et al. | Oct. 24, 1950 |

FOREIGN PATENTS

| Number | Country | Date |
|---|---|---|
| 313,863 | Great Britain | June 18, 1929 |